United States Patent
Roche et al.

(10) Patent No.: US 11,850,974 B2
(45) Date of Patent: Dec. 26, 2023

(54) VEHICLE SEAT WITH INCLINABLE SEAT BOTTOM AND SEATBACKS TO IMPROVE ACCESS TO THE REAR PLACES

(71) Applicant: FAURECIA Sièges d'Automobile, Nanterre (FR)

(72) Inventors: Sylvain Roche, Varennes Changy (FR); David Epaud, Lardy (FR); Farouk Bouzid, Bretigny sur Orge (FR)

(73) Assignee: FAURECIA Sièges d'Automobile, Nanterre (FR)

(*) Notice: Subject to any disclaimer, the term of this patent is extended or adjusted under 35 U.S.C. 154(b) by 85 days.

(21) Appl. No.: 17/536,469

(22) Filed: Nov. 29, 2021

(65) Prior Publication Data
US 2022/0169154 A1    Jun. 2, 2022

(30) Foreign Application Priority Data
Nov. 30, 2020   (FR) ...................................... 20 12374

(51) Int. Cl.
| | | |
|---|---|---|
| *B60N 2/20* | (2006.01) | |
| *B60N 2/12* | (2006.01) | |
| *B60N 2/22* | (2006.01) | |
| *B60N 2/30* | (2006.01) | |

(52) U.S. Cl.
CPC ................. *B60N 2/12* (2013.01); *B60N 2/20* (2013.01); *B60N 2/2209* (2013.01); *B60N 2/309* (2013.01); *B60N 2/3011* (2013.01); *B60N 2/3065* (2013.01)

(58) Field of Classification Search
CPC .... B60N 2/3011; B60N 2/2209; B60N 2/309; B60N 2/3065; B60N 2/12; B60N 2/20
See application file for complete search history.

(56) References Cited

U.S. PATENT DOCUMENTS

| | | | |
|---|---|---|---|
| 11,465,536 B2 * | 10/2022 | Epaud ................. | B60N 2/2231 |
| 2019/0351792 A1 | 11/2019 | Kaemmerer | |
| 2019/0366886 A1 | 12/2019 | Sivaraj | |

FOREIGN PATENT DOCUMENTS

FR            2990167           11/2013

* cited by examiner

*Primary Examiner* — Syed A Islam
(74) *Attorney, Agent, or Firm* — BARNES & THORNBURG LLP

(57) ABSTRACT

A vehicle seat comprising: seatback; a seat bottom mounted pivoting relative to the seatback and a track comprising a fixed element and a mobile element moveable relative to the fixed element. The seat bottom pivots relative to the mobile element of the track. The seatback slides relative to the fixed element of the track. The seatback pivots relative to the fixed element of the track, around the mobile transverse axis. A stop limits the movement of the seatback. The seat bottom is shaped for pulling on the seatback and causing the rotation of the seatback, in case of movement of the mobile element of the track relative to the fixed part once the stop blocks the movement of the seatback.

22 Claims, 10 Drawing Sheets

Figure 1:
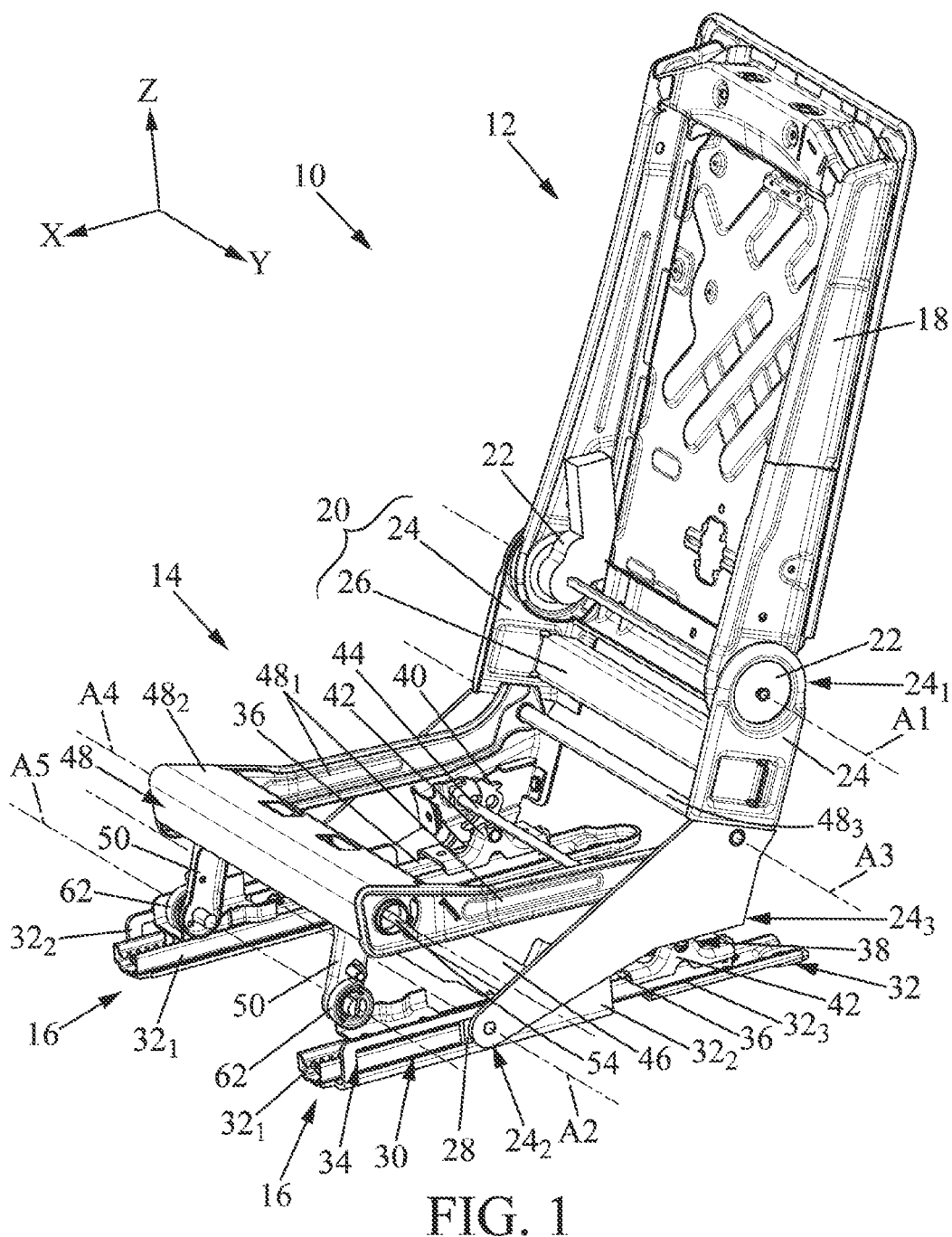

VEHICLE SEAT WITH INCLINABLE SEAT BOTTOM AND SEATBACKS TO IMPROVE ACCESS TO THE REAR PLACES

PRIORITY CLAIM

This application claims priority to French Patent Application No. FR2012374, filed Nov. 30, 2020, which is expressly incorporated by reference herein.

BACKGROUND

The present disclosure relates to a vehicle seat. A process for using such a vehicle seat is also described.

SUMMARY

According to the present disclosure, a vehicle seat comprises a seatback, a seat bottom mounted pivoting relative to the seatback around a first transverse axis, and at least one track, where the track comprises a fixed element and a mobile element moveable relative to the fixed element along a longitudinal direction.

In illustrative embodiments, the seat bottom pivots relative to the mobile element of the track, around a second transverse axis; near one end, the seatback is mounted sliding along the longitudinal direction relative to the fixed element of the track; near the end, the seatback is further mounted pivoting relative to the fixed element of the track around a third transverse axis, where the third transverse axis is mobile along the longitudinal direction; a stop limits the longitudinal movement of the end of the seatback; and the seat bottom is shaped for pulling on the seatback and causing the rotation of the seatback around the third transverse axis, in case of movement of the mobile element of the track relative to the fixed part, tending to increase the distance between the second transverse axis and the third transverse axis, while the stop blocks the movement of the end of the seatback.

In illustrative embodiments, the seat has kinetics in which the easy entry position may be reached without making use of a specific actuator. In particular, in the case where the seat comprises at least one track moved by a motor, this motor may suffice for reaching the easy entry position of this kinematics.

In illustrative embodiments, the seat comprises one or more of the following characteristics taken alone or in combination:
  the seat comprises two parallel tracks, separated along a transverse direction;
  the seat bottom pivots relative to the mobile elements of each track, around a second transverse axis; one end of the seatback is mounted sliding along the longitudinal direction relative to the fixed element of each track; each end of the seatback is further mounted pivoting relative to the fixed element of a respective track, around a third transverse axis, where the third transverse axis is mobile along the longitudinal direction; a stop limits the longitudinal movement of each end of the seatback, where the two stops are aligned along a transverse direction; and the seat bottom is shaped for pulling on the seatback and causing a rotation of the seatback around the third transverse axis in case of movement of the mobile element of each track relative to the fixed part, aiming to increase the distance between the second transverse axis and the third transverse axis, while the stops block the movement of the ends of the seatback;
  the seat further comprises an actuator, preferably just one, for commanding the movement of the mobile element of each track, relative to the respective fixed element;
  the seatback is further fixed to the mobile element of at least one track, preferably of each track, by a lock, where the seat preferably has a command device for unlocking of each lock;
  the seatback comprises a seatback framework, a base, and at least one hinge mechanism with which to change the relative position of the seatback framework relative to the base, around a fourth transverse axis;
  the seat bottom is mounted pivoting on the base;
  the seat bottom is mounted pivoting on the seatback framework;
  a first spring elastically forces the seat bottom to rotate relative to the mobile element of each track, around the second transverse axis, towards a position in which the rear of the seat bottom is raised relative to the front of the seat bottom;
  the seat bottom comprises a seat bottom framework, mounted pivoting relative to the seatback around the first transverse axis, and a connecting rod joining the seat bottom framework to the mobile element of each track, where each connecting rod pivots relative to the mobile element of the respective track around the second transverse axis;
  the or each connecting rod and the seat bottom framework are rigidly connected in movement;
  the or each connecting rod pivots relative to the seat bottom framework, around a fifth transverse axis;

In illustrative embodiments, the seat further comprises a second spring elastically constraining each connecting rod in rotation relative to the seat bottom framework around the fifth transverse axis, towards a folded back position under the seat bottom framework; near each end, the seatback, in particular the base if applicable, is fixed to a slider longitudinally moveable relative to the fixed element of a respective slider; the slider is received sliding in a slit in the fixed element of the respective track; the seatback is mounted on each slider pivoting around the third transverse axis; and the stop is formed by a longitudinal end of the slit.

In illustrative embodiments, an automotive vehicle comprises a chassis and a body defining a passenger compartment with a floor, and at least one seat such as described above in all combinations thereof, where the fixed element of each track is fixed to the floor or formed by the floor of the passenger compartment.

In illustrative embodiments, the vehicle may comprise at least one door arranged longitudinally by the seat, and at least one other seat arranged longitudinally behind the seat. The vehicle might not have a door arranged longitudinally near the other seat.

In illustrative embodiments, a process is described for using a seat such as described above, in all combinations thereof, allowing changing from a position suited to receiving an occupant to an easy entry position, where the process comprises the step i) consisting of moving the mobile element of each track relative to the associated fixed element in the direction tending to increase the distance between the second transverse axis and the third transverse axis while each stop prevents the movement of a respective end of the seatback.

In illustrative embodiments, the process may comprise a step ii), preceding the step i), consisting of moving the mobile element of each track relative to the fixed element, until each stop prevents the movement of a respective end of the seatback.

In illustrative embodiments, the process may further comprise a step iii), prior to step i), consisting of unlocking each lock.

In illustrative embodiments, a process is described for using a seat such as described above in all combinations thereof, wherein the process allows changing from a position suited to receiving an occupant, and an emergency exit position, where the process comprises the step a) consisting of unlocking each lock, and step b), subsequent to step a), consisting of exerting a force on the seatback along a substantially longitudinal direction, in particular by pushing or pulling, in order to cause the rotation of the seatback around a third transverse axis.

In illustrative embodiments, a process is described for using a seat such as described above in all combinations thereof, wherein the process allows changing the seat from a position suited for receiving an occupant into a position called "flat floor" in which the seatback extends facing the seat bottom, where the process comprises the step consisting of pivoting the seatback relative to the base, around the fourth transverse axis, in order to reach a position in which the seatback is substantially horizontal, the pivoting of the seatback causing a pivoting of the seat bottom relative to the seatback framework accompanying a lowering of at least a part of the seat bottom relative to the position for receiving an occupant.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
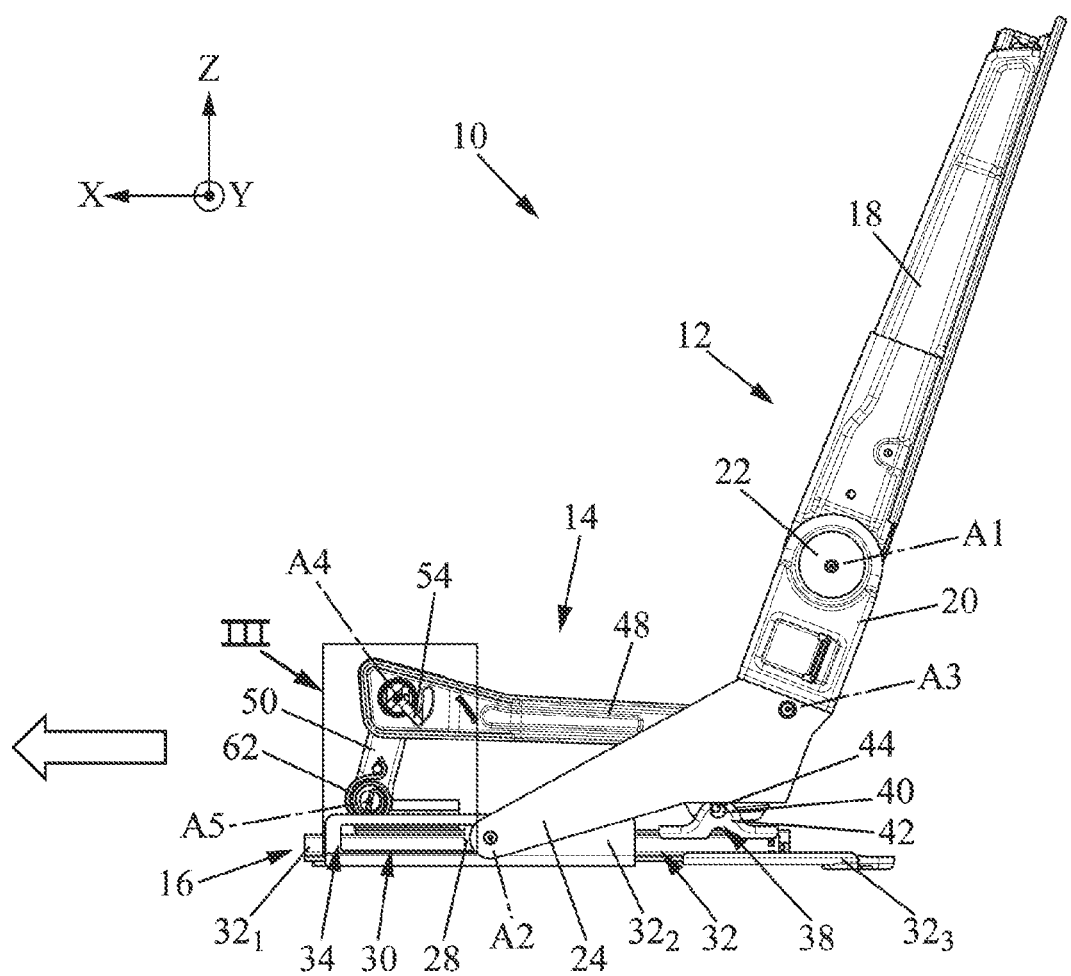
Figure 3:
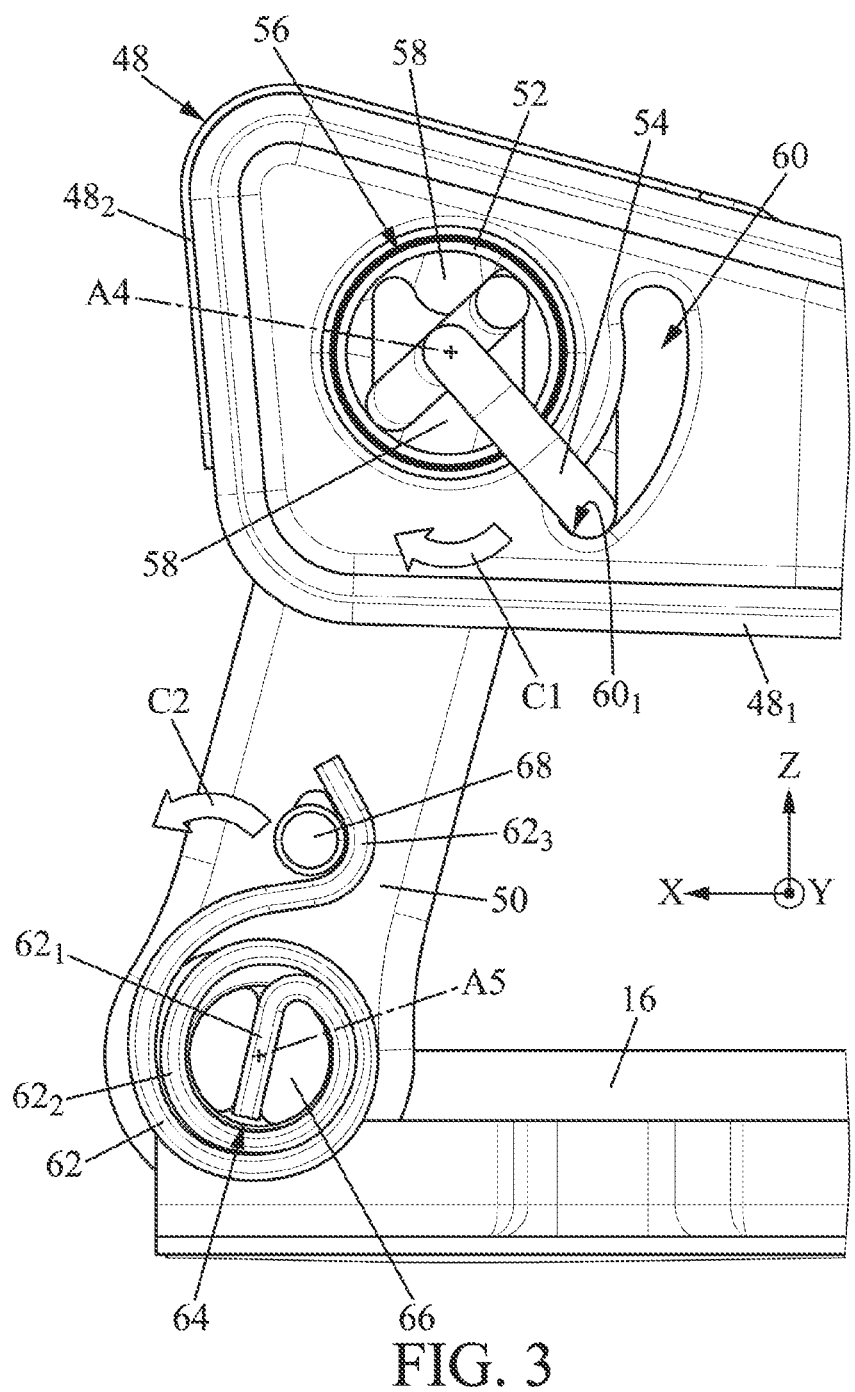
Figure 4:
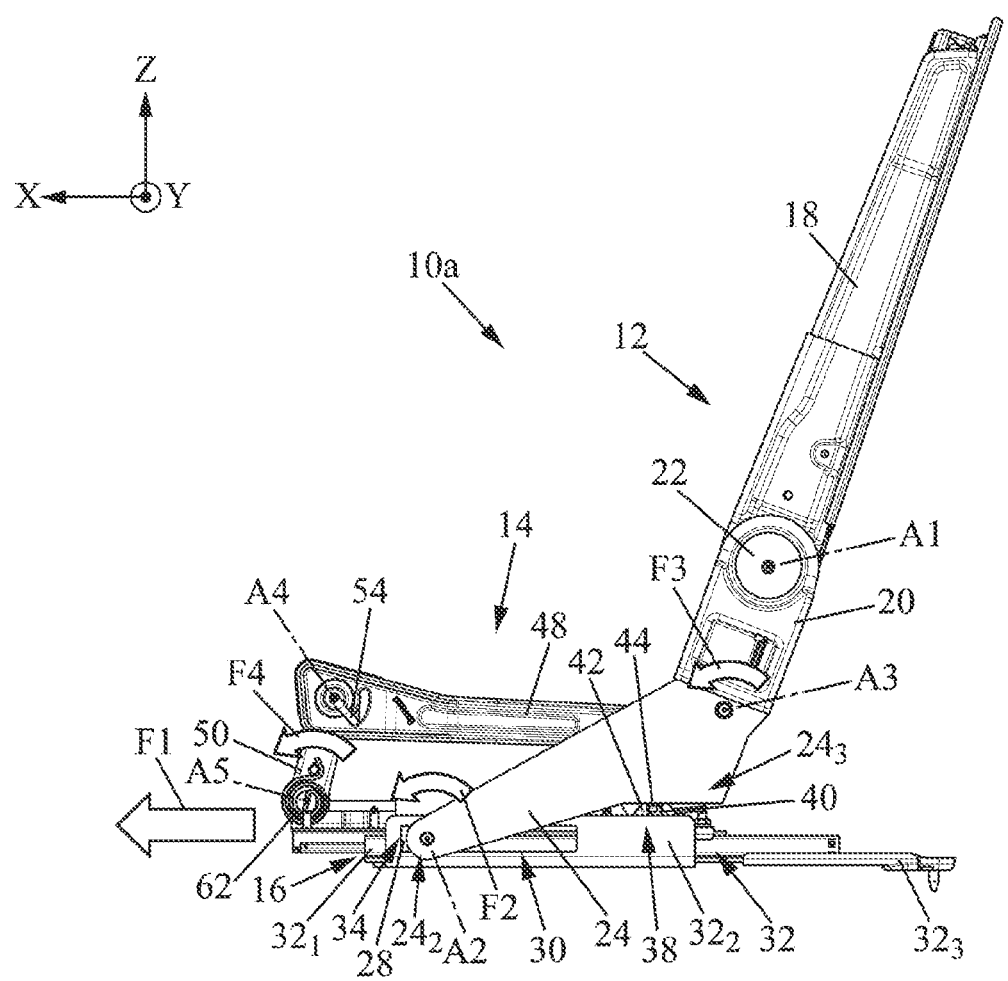
Figure 5:
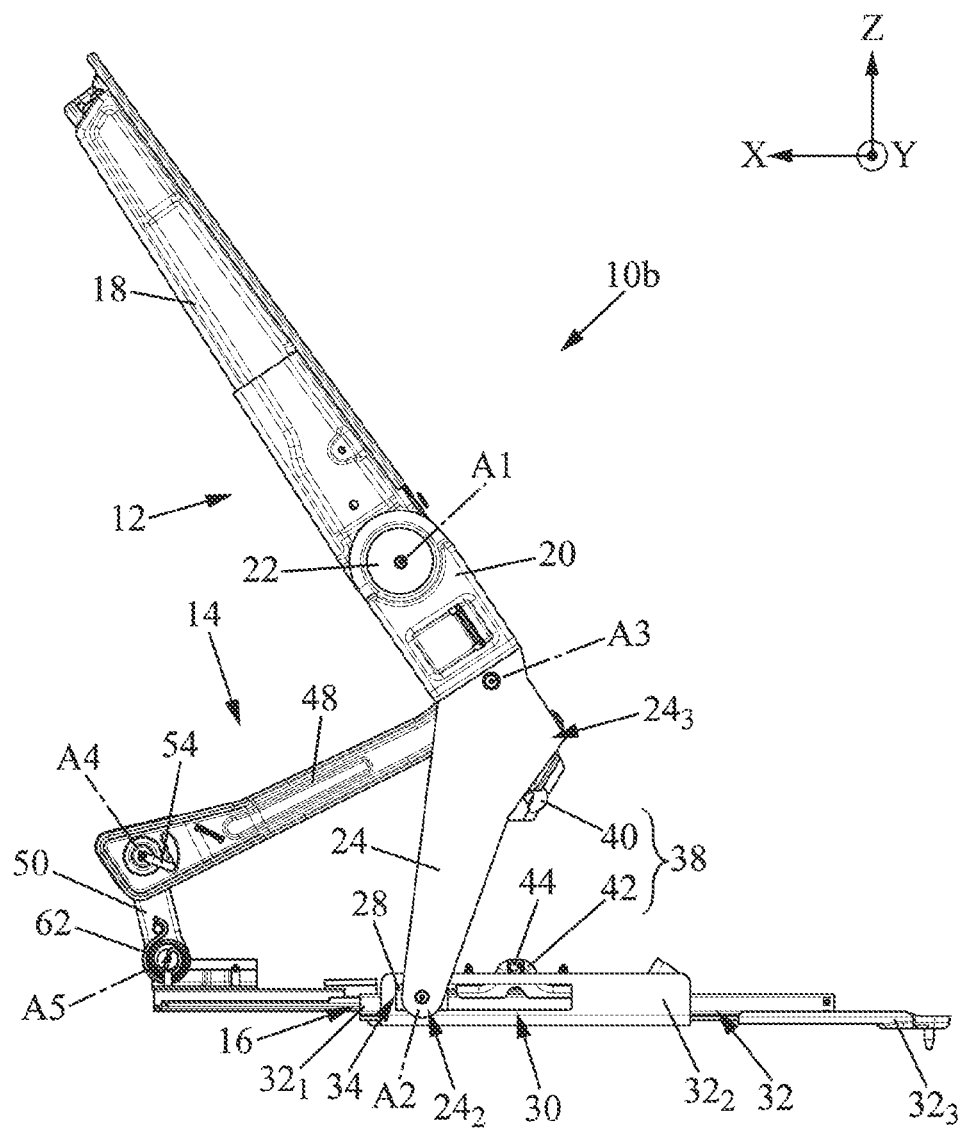
Figure 6:
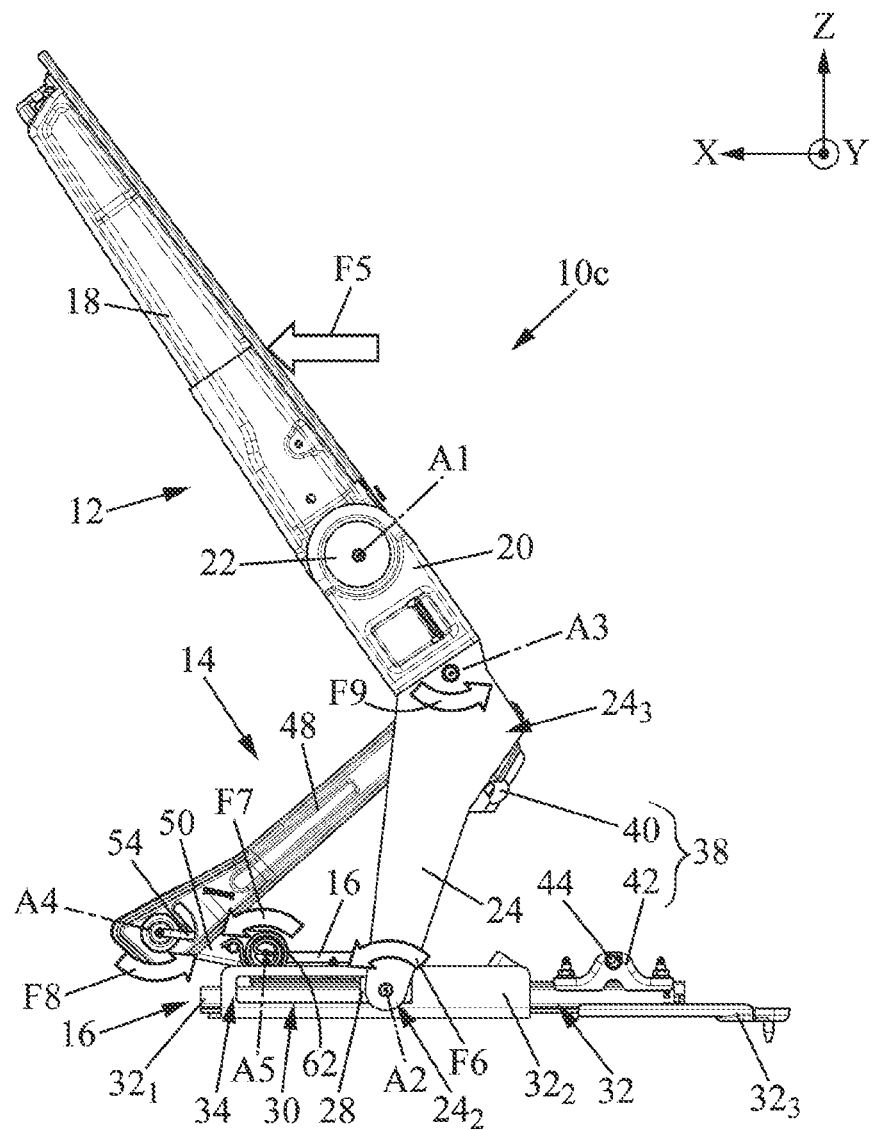
Figure 7:
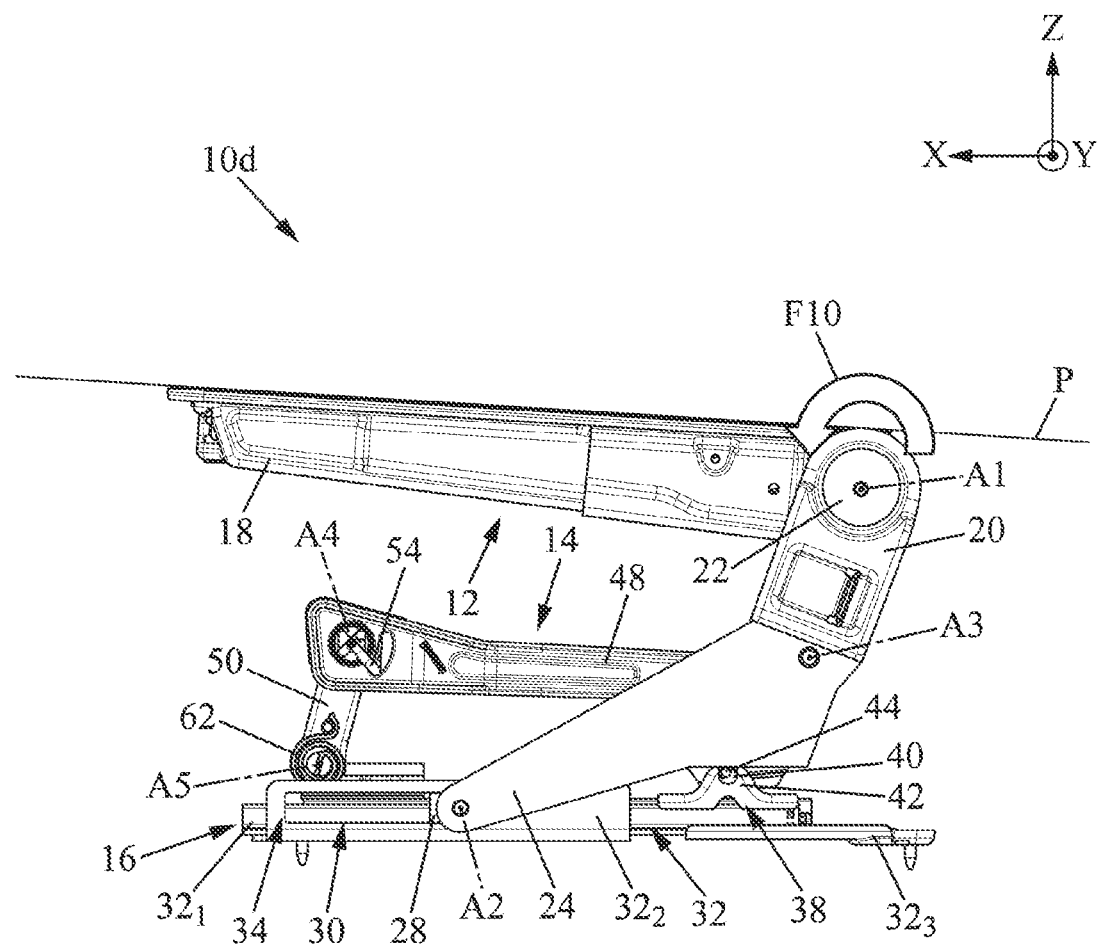
Figure 8:
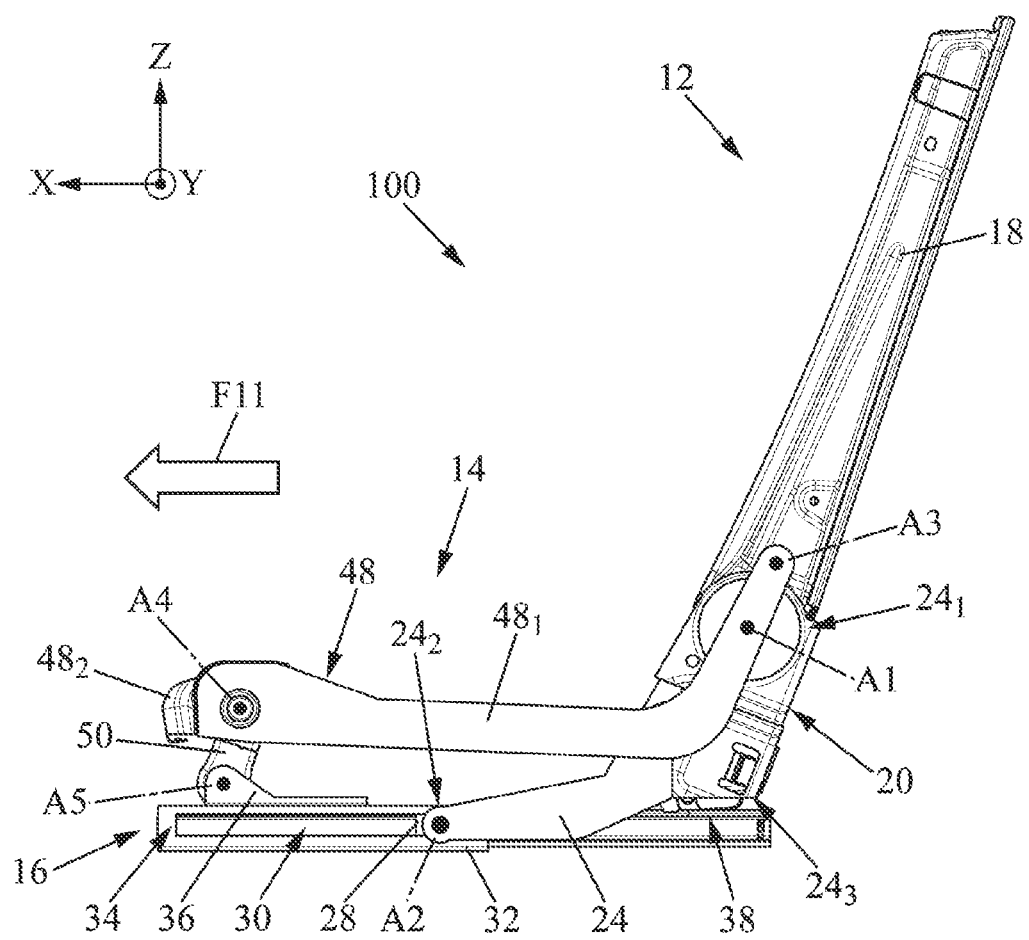
Figure 9:
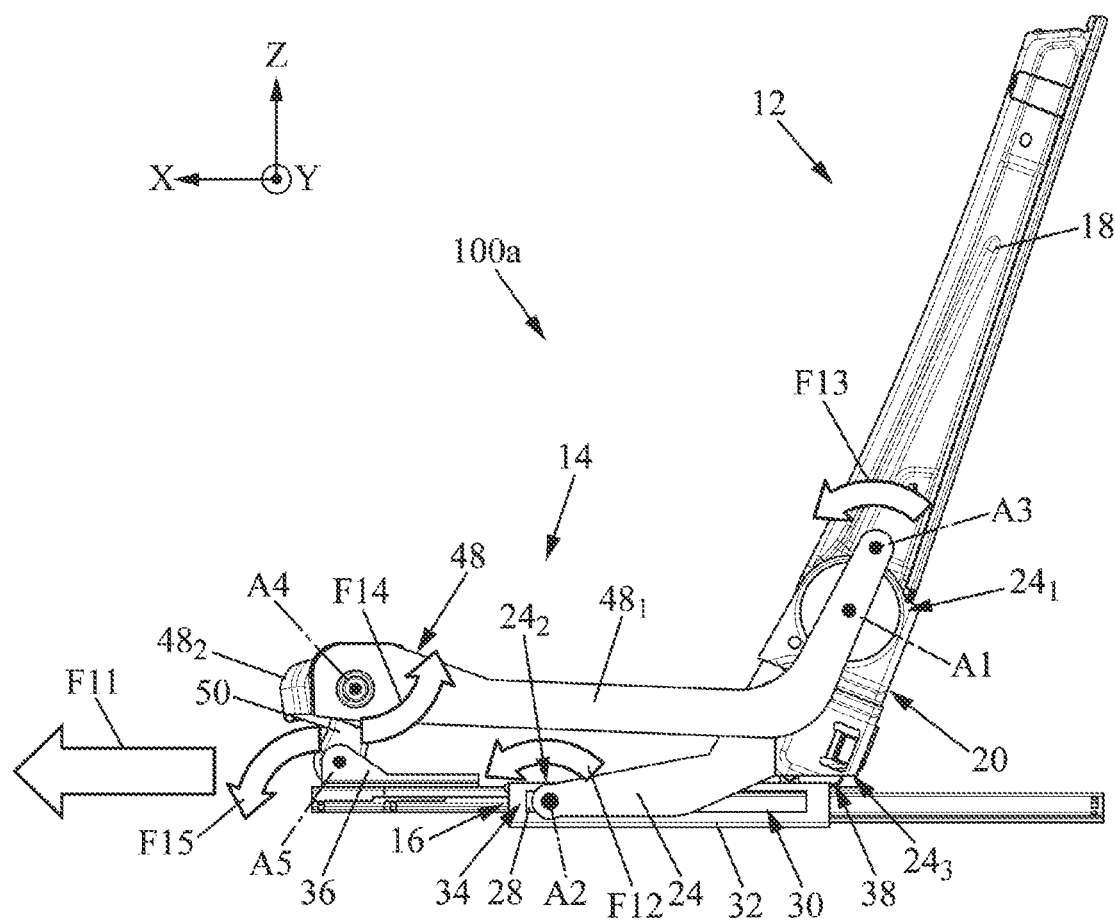
Figure 10:
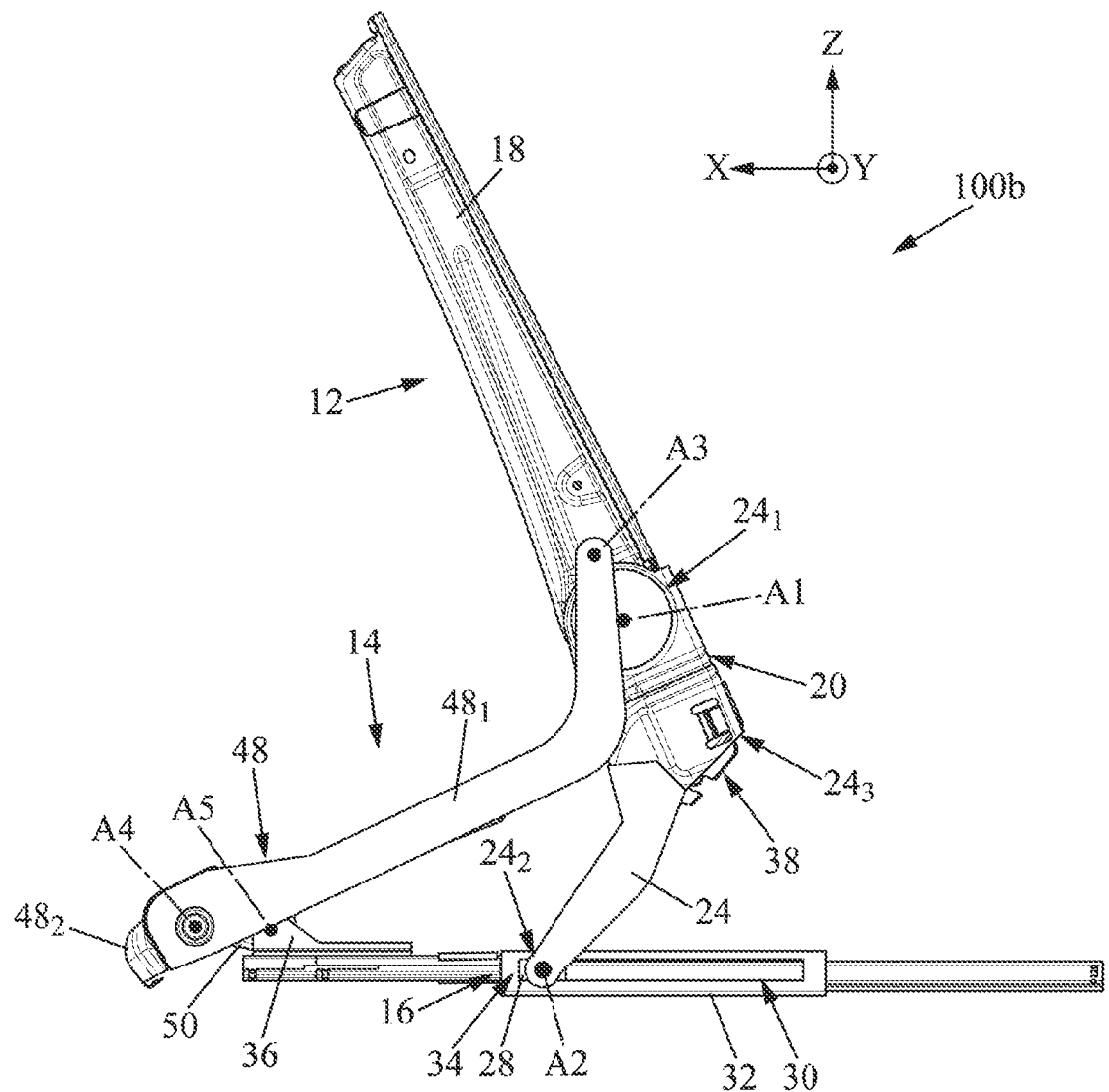

The detailed description particularly refers to the accompanying figures in which:

FIG. 1 schematically shows in perspective a first example of a vehicle seat in a nominal position, suited for receiving an occupant;

FIG. 2 schematically shows an inside view the first example of a seat, in the position from FIG. 1;

FIG. 3 schematically shows a detail from FIG. 2;

FIG. 4 schematically shows in side view, the first example of a seat, in an intermediate position between the nominal position in FIGS. 1 and 2, and an easy entry position in FIG. 5;

FIG. 5 schematically shows in side view the first example of a vehicle seat, in easy entry position;

FIG. 6 schematically shows in side view the first example of a vehicle seat, in an emergency exit position;

FIG. 7 schematically shows in side view the first example of a vehicle seat, in a tray position;

FIG. 8 schematically shows in perspective a second example of a vehicle seat in a nominal position, suited for receiving an occupant;

FIG. 9 schematically shows in side view, the second example of a vehicle seat, in an intermediate position between the nominal position of FIG. 8, and an easy entry position from FIG. 10; and FIG. 10 schematically shows in side view the second example of a vehicle seat, in an easy entry position.

DETAILED DESCRIPTION

In the various figures, the same references designate identical or similar items.

In the description which follows, the indications for spatial positioning such as top, bottom, upper, lower, horizontal, vertical, etc. are given for clarity of the exposition, according to the usual position of use of the seat, but are not limiting. More specifically, the orientations relative to the front and the rear of the seat are relative to the usual position of use of the seat.

Longitudinal direction X is understood to mean a horizontal direction extending between the front and rear of the vehicle seat. Transverse direction Y is understood to mean a horizontal direction extending from one side of the vehicle seat and extending to the other side of the vehicle seat. Vertical direction Z is understood to mean the direction perpendicular to the longitudinal direction X and the transverse direction Y.

As shown in FIGS. 1 and 2 in particular, a vehicle seat 10 comprises a seatback 12, a seat bottom 14 and two tracks 16. The tracks 16 are themselves fixed to the floor of the passenger compartment of an automotive vehicle. The tracks 16 are separated from each other in the transverse direction Y. Here, the two tracks 16 are parallel.

The seat 10 may, for example, be a front seat of an automotive vehicle with three doors. The door may be arranged longitudinally near the seat 10. Another seat may be arranged longitudinally behind the seat 10. The automotive vehicle might not have a door arranged longitudinally near the other seat. The seat 10 may, according to another variant, be a seat from the second row of seats, in particular in a vehicle with five doors comprising three rows of seats.

The seatback 12 here comprises a seatback framework 18 and a base 20. The seatback frame 18 is here mounted pivoting relative to the base 20, around a first transverse axis A1. In order to do that, a hinge mechanism 22 is arranged on each side of the seat 10, between the seatback 18 and the base 20.

In the example shown, the base 20 takes the form of two lateral risers 24, connected together by a crosspiece 26. Each lateral riser 24 here has a "V" shape.

Here, each hinge mechanism 22 is arranged near a first free end $24_1$ of a respective riser 24.

Near one free end $24_2$, across from the first free end $24_1$, each riser 24 is fixed on a slider 28 pivoting around the second transverse axis A2. Each slider 28 is received freely in translation along the longitudinal direction X, in a slit 30 formed in a fixed element 32 of a respective track 16. Each fixed element 32 may be fixed to the floor of the passenger compartment receiving the seat 10. Each slit 30 has one longitudinal end 34, forming a longitudinal stop for the slider 28 received in the slit 30.

In the example shown, the fixed element 32 of each track 16 comprises several parts fixed to each other. In that way, the fixed element 32 first comprises a rail $32_1$ or profile. This rail $32_1$ is fixed to a sheet metal $32_2$ extending mainly along the longitudinal direction X. The sheet metal $32_2$ here has an "L" shaped section. Here, the slit 30 is formed on the substantially vertical leg of the sheet metal $32_2$. Finally, the fixed element 32 comprises the support $32_3$ for the rail $32_1$, arranged longitudinally behind the sheet metal $32_2$. Here the support $32_3$ takes the shape of substantially flat sheet metal.

Finally, near the median end $24_3$ thereof, longitudinally between the first and second ends $24_1$, $24_2$, each lateral riser 24 is rigidly fixed to a mobile element 36 of a respective track 16. Each mobile element 36 is mounted mobile along the longitudinal direction X relative to the fixed element 32 of the respective track 16. For example, each fixed or mobile element 32, 36 of a track 16 is or comprises a rail or profile. A locking device, not shown on the figures, may serve to immobilize at least one mobile element 36 relative to the associated fixed element 32, preferably each mobile element 36 relative to the associated fixed element 32.

A lock 38 is provided here between each of the lateral risers 24 and the mobile element 36 of the associated track 16. Each lock 38 comprises a bolt 40 and strike plate 42. Here the bolt 40 is mounted rotatably around a transverse axis on the lateral riser 24 of the base 20. The strike plate 42 is fixed on the mobile element 36 of the track 16. The bolt 40 is normally at least partially received in the strike plate 42 in order to secure the lateral riser 24 and the mobile element of the track 36. Here a single command member 44 serves to synchronously unlock the two locks 38. For example, the command member 44 commands the rotation of the bolt 40 around a transverse axis, completely releasing the bolt 40 from the strike plate 42. The bolt 40 is, for example, elastically forced towards an unlocked position of the lock 38, with the command member 44, in the locked position thereof, blocking the pivoting of the bolt 40. In contrast, in an unlocked position, the command member 44 allows the pivoting of the bolt 40 towards the unlocked position thereof.

In the example shown in FIG. 1, an actuator 46 is provided between the two tracks 16 for synchronized command of the movement of each of the mobile elements 36 relative to the associated fixed element 32, in the longitudinal direction X. For example, the actuator 46 comprises a single motor. Here, the actuator 46 is suited to command a longitudinal movement of the mobile element 36 of each track 16 over a distance, measured along the longitudinal direction X, greater than the length of the slit 30.

Further, the seat bottom 14 is mounted pivoting relative to the seatback 12, in the case at hand relative to the base 20, around a third transverse axis A3.

According to the example shown in FIG. 1, the seat bottom 14 here comprises a seat bottom framework 48. The seat bottom framework 48 comprises here two parallel stringers $48_1$, mainly extending along the longitudinal direction X, connected by a front crosspiece $48_2$ and a rear crosspiece $48_3$, extending mainly along the transverse direction Y. Here, the rear crosspiece $48_3$ has a substantially cylindrical shape. Here, the rear crosspiece $48_3$ is received in a hole of each of the lateral risers 24, freely rotating around the transverse axis A3, in order to provide freedom of rotation of the seat bottom 14 relative to the base 20 around the third transverse axis A3.

The seat bottom 14 further comprises, in the example shown, two connecting rods 50 each joining the seat bottom framework 48 to the mobile element 36 of one of the two tracks 16. Preferably the connecting rods 50 extend to near the front end of the seat bottom framework 48. In particular, each connecting rod 50 connects a front end of a respective stringer $48_1$ of the seat bottom framework 48 to the mobile element 36 of a respective track 16.

The two connecting rods 50 may be secured by means of a crosspiece 52.

Each connecting rod 50 is here mounted pivoting relative to the seat bottom framework 48, in particular relative to the stringers $48_1$ of the seat bottom framework 48, around a fourth transverse axis A4. A first spring 54 here is provided between each connecting rod 50 and the seat bottom framework 48 which elastically forces the connecting rod 50 to rotate relative to the seat bottom framework 48, around the fourth transverse axis A4. Here, each first spring 54 elastically forces the associated connecting rod 50 towards a position folded-down under the seat bottom framework 48, as shown in FIG. 3 by the arrow C1.

To do that, for example, the two connecting rods 50 are secured by a cylindrical crosspiece 52 received in a circular opening 56 of each of the stringers $48_1$. Each first spring 54 may then be a torsional spring. Each first spring 54 is received in the crosspieces 52, by a respective end of the cylindrical crosspiece 52. Each first spring 54 has a first part, near a first end, which is held in relative position relative to the cylindrical crosspiece 52, around a fourth transverse axis A4. Here, the first part of the first spring 54 has the shape of a loop. Here, the first part of each first spring 54 is prevented from pivoting relative to the crosspiece 52, around the fourth transverse axis A4, by two opposite reliefs 58 in the crosspiece 52. Alternatively, the crosspiece 52 may have a hole in the lateral surface thereof, receiving the first end of each first spring 54.

Each first spring 54 further has a second part, near a second end, opposite the first end, which is received in a window 60 arranged in the neighboring stringer $48_1$, in order to limit or even prevent possible rotation of this second part around the fourth transverse axis A4. Here, the slit 60 has a circular arc shape. Here, the second end of the first spring 52 is elastically forced to stop against the lower end $60_1$ of the slit 60.

However, other means are accessible to the person skilled in the art for mounting the connecting rods 50 elastically forced to rotate relative to the seat bottom framework, around the fourth transverse axis A4.

Further, each connecting rod 50 is here mounted pivoting relative to the mobile elements 36 of a respective track 16, around a transverse axis A5. The second spring 62 is here provided between each connecting rod 50 and the mobile element 36 of the respective track 16, which elastically forces the connecting rod 50 to rotate relative to the mobile element 16, around the fifth transverse axis A5. Here, each second spring 62 elastically forces the associated connecting rod 50 towards a position of increasing the angle between the connecting rod 50 and the mobile element 36 of the slider 16, as shown by the arrow C2 on FIG. 3.

To do this, for example, each second spring is formed by a blade 62, here of metal, wound around a fifth transverse axis A5. A first end part $62_1$ of each blade 62, near a first radially inner end, may then be received in a slit 64 diametrically from a cylindrical relief 66, secured to the mobile element 36. The cylindrical relief 66 here has a circular section. The axis of the cylindrical relief 66 is the fifth transverse axis A5. Each blade 62 may then be wound around the cylindrical relief 36, over an intermediate part $62_2$. Finally, a second extreme part $62_3$ of each blade 62, near the second radially outer end thereof, may be curved and comes to stop against a relief 68, secured to a respective connecting rod 50. The second end part $62_3$ of each blade 62 is curved around an axis parallel to the fifth transverse axis A5, in a direction opposite to the winding of the intermediate part $62_2$. Here, the relief 68 secured to the connecting rod 50 is cylindrical, with a circular section, and axis parallel to the fifth transverse axis A5. Here, the second end part $62_3$ of each blade 62 is elastically forced against the cylindrical relief 68 of the respective connecting rod 50, where the blade 62 pushes the connecting rod 50 in a substantially longitudinal direction C2 towards the front of the seat 10.

In the remainder, three processes for using the seat 10 are described in more detail, where each allows changing the seat 10 from a nominal position such as shown by FIGS. 1 to 3, to another respective position of the seat, each providing a functionality of the seat 10.

FIGS. 2, 4 and 5 show a first example of a process for using the seat 10 allowing changing the seat 10 from a nominal position such as shown in FIG. 2, to an easy entry position 10*b* shown in FIG. 5.

It should be noted that the nominal starting position of this first process may vary. On the one hand, the longitudinal position of the seat 10 may be different. In other words, the longitudinal position of the mobile elements 36 and the fixed elements 32 of the track may be different. The longitudinal position of the seat 10 and the nominal position may a priori vary over the full range allowed by the length of the slit 30 receiving the slider 28.

Further, the relative position of the seat bottom framework 18 around the first transverse axis A1 relative to the base 20 may be different. In fact, the hinge mechanisms 22 may allow an adjustment, called "comfort," of the orientation around the first transverse axis A1 of the seat back framework 18 relative to the base 20. The angular adjustment range of the orientation around the first transverse axis A1 of the seatback framework 18 relative to the base 20 is for example included between 0 and 20°. Advantageously, however, the process is implemented while the seatback framework 18 extends in the extension of the risers 24 of the base 20. In that way, the bulk of the seatback 12 is a priori limited which aids the movement thereof.

Here, the first process for use comprises a first step, shown by FIG. 4, consisting of moving the seat 10 and, preferably synchronized, the mobile element 36 of each slider 16 longitudinally forward. This longitudinal movement F1 is done until bringing each slider 28 to stop against the end 34 of the respective slit 30. The seat 10 in that way reaches the position 10*a* thereof shown in FIG. 4 at the end of this first step. This movement F1 may be done by means of the single actuator 46.

During this first step, the configurations of the seatback 12 and the seat bottom 14 are preferably kept unchanged.

As it relates to the seatback 12, this means in particular that the relative position of the seat bottom framework 18 around the first transverse axis A1 relative to the base 20 is preferably retained. In that way, preferably, each hinge mechanism 22 is kept in position during the movement F1. Alternatively, in the case where hinge mechanisms 22 are motorized, the seatback framework 18 may be moved during this first step, relative to the base 20, in particular in order to limit the bulk of the seatback 12. In particular, each hinge mechanism 22 may command a rotation of the seatback framework 18 relative to the base 20, around a first transverse axis A1, bringing the seatback framework 18 to extend in the extension of the risers 24 of the base 20. In other words, each hinge mechanism 22 may command a rotation of the seatback framework 18 relative to the base 20, around a first transverse axis A1, bringing the seatback framework 18, in particular the back of the seatback framework 18, to extend in the plane or parallel to the plane of extension of the crosspiece 26 of the base 20.

Further, each lock 38 is preferably kept locked over the majority of this first step, or even throughout all of this first step. However, preferably, each lock 38 is unlocked during this first step, while each slider 28 comes closer to the axial end 34 of the slit 30 in which it is received, without contacting this axial end 34 of the slit 30. Alternatively, however, each lock 38 may be unlocked before this first step—therefore before the movement F1 of the mobile element 36 of each slider 16—or even after this first step. In this latter case, the process comprises an intermediate step consisting of unlocking each lock 38 when each slider 28 is stopped against the end 34 of the respective slit 30.

As it relates to the seat bottom 14, the relative positions of the seat bottom framework 48 relative to each connecting rod 50, on the one hand, and each connecting rod 50 relative to the mobile element 36 of the associated slider 16, on the other hand, are also kept during this first step.

Once the seat 10 is in the configuration 10*a* thereof from FIG. 4 in which each slider 28 is stopped against the axial end 34 of the respective slit 30 and each lock 38 is unlocked, the first process continues with a second step consisting here of commanding a continuation of the forward movement F1 of the mobile element 36 of each slider 16, while each slider 28 is stopped against the end 34 of the slit 30 in which it is received. The movement F1 then tends to increase the distance between the second and fifth transverse axes A2, A5. A forward movement of the second end $24_2$ of the risers 24 of the base is prevented during this second step by the stop between the end 34 of the slit 30 and the slider 28 received in the slit 30. Subsequently, the movement F1 of the mobile elements 36 of each track 16, here commanded by the actuator 46, pulls on the seatback 12, via the seat bottom 14, near the third transverse axis A3. The seatback 12 then tends to pivot or tilt around the second transverse axis A2 as shown by the arrow F2 in FIG. 4. This causes the lifting of the intermediate end $24_3$ of each riser 24 of the base 20 relative to the mobile element 36 of the respective slider 16. This lifting of the intermediate end $24_3$ of each riser 24 of the base 20 is allowed because each lock 38 is unlocked.

The pivoting F2 of the seatback 12 here accompanies a relative pivoting F3 around the third transverse axis A3, of the seatback 12 relative to the seat bottom 14. This pivoting F2 of the seatback 12 relative to the seat bottom 14 tends to increase the distance between the second and fourth transverse axes A2, A4.

Each first spring 54 is then advantageously conformed for avoiding a pivoting of each connecting rod 50 relative to the seat bottom framework 48, tending to increase the distance between the third and fifth transverse axes A3, A5, accompanying the movement F1 of the mobile element 36 of each track 16, at least in a first step. For example, the force C1 exerted by each first spring 54 compensates for the component of the weight of the seat 10 that tends to pivot each connecting rod 50, associated with the respective first spring 54, relative to the seat bottom framework 48. Thus, advantageously, during the second step of this process, there is no relative rotation of the connecting rods 50 relative to the seat bottom framework 48, around the fourth transverse axis A4. This relative rotation of the connecting rods 50 relative to the seat bottom framework 48 around a fourth transverse axis A4 is at least limited, in particular limited to a few degrees, preferably less than 10°.

Further, the action of each second spring 62, tending to pivot each connecting rod 50 around a fifth transverse axis A5, as shown by the arrow F4 in FIG. 4, may contribute to the pivoting F2 of the seatback 12 of the seat around the second transverse axis A2. In that way, the raising of the seatback 12 relative to the mobile element 36 of each track 16 is made easier. This may allow in particular sizing the actuator 46, in particular the motor of this actuator 46, in light of the main functions thereof of moving the mobile element 36 of each track 16 without having to consider the excess or some of the excess power needed for lifting the seatback 12 of the seat 16 during this second step.

Again during this second step, the relative position of the seat bottom framework 18 around the first transverse axis A1 relative to the base 20 is preferably kept unchanged. In that way, preferably, each hinge mechanism 22 is kept in position during this second step.

Thus, the seat 10 is brought to the position 10*b* shown in FIG. 5 and called easy entry. In this position 10*b* of the seat

10, the seatback 12 has tilted around the second transverse axis A2, relative to the normal position from FIG. 1. Having done that, the longitudinal bulk of the seat 10 is reduced. This way, the space available for a user to access the seat(s) located behind the seat 10 is increased. It can in particular be noted here that the distance between the first and fifth transverse axes A1 and A5 of the seat 10, measured along the horizontal longitudinal direction X is smaller in the easy entry position 10*b* than in the nominal position from FIG. 1. Additionally, the seat 10 is moved longitudinally forward in the easy entry position 10*b*. The space available for a user to access the seat located behind the seat 10 is even further increased.

FIG. 6 schematically shows a third configuration 10*c* of the seat 10, called emergency exit, reached by using a second example of a process for using the seat 10 starting from the nominal position of the seat 10 shown in FIGS. 1 and 2.

Also in this second process, the initial longitudinal position of the seat 10 and/or the relative position of the seatback framework 18 relative to the base 20, around the first transverse axis A1, may be different, as previously explained in connection with the first process example described.

The second process example may omit the longitudinal movement of the mobile elements 36 of the tracks 16. Here, it involves moving the seatback 12 in order to allow a person behind the seat 10 to leave the vehicle that is equipped with it.

Here, the actuator 46 is not used.

The second process comprises a first step of unlocking each lock 38. This step may be done by means of an actuator. In particular, in case of impact, and after a time delay and/or by engagement with a presence detector indicating that there is no occupant of the seat 10, an actuator provided for that purpose may command an unlocking of each lock 38. Alternatively, however, the unlocking of each lock is commanded or even done directly by the person seated behind the seat 10 and who wishes to leave the vehicle. For example, this person may act directly on the command member 44 of the one or more locks 38. Alternatively, the person may make use of an emergency unlocking command for each lock 38 which acts on this command member 44.

Once each lock 38 is unlocked, the person wishing to exit, pushes on the seatback 12, in particular on the seatback framework 18, as shown by the arrow F5 in FIG. 6. Doing this causes a tilting F6 of the seatback 12 around the second transverse axis A2.

This tilting F6 may be made easier by the contribution of the force C2 of each second spring 62 on the associated connecting rod 50, which tends to tilt each connecting rod 50 around the fifth transverse axis A5, as shown by the arrow F7 in FIG. 6.

The pivoting of each connecting rod 50 around the fifth transverse axis A5 here accompanies a pivoting F8 of each connecting rod 50 relative to the seat bottom framework 48, around the fourth transverse axis A4. Here, the pivoting F8 is made easier by the force C1 exerted by each first spring 54, which tends to push each connecting rod 50 towards a position under the seat bottom framework 48.

Further, the tilting F6 of the seatback 12 accompanies a relative pivoting F9 of the seat bottom 14 relative to the seatback 12, tending to increase the distance between the second and fourth transverse axes A2, A4 measured along the horizontal, longitudinal direction X.

In this way, the emergency exit position 10*c* from FIG. 6 is reached. This position is distinguished from the easy entry position 10*b* in that in the emergency exit position 10*c* each slider 28 is not a priori stopped against the longitudinal end 34 of the slit 30. Each slider 28 may be stopped against the end 34 of the slit 30 only if it was there in the initial nominal position. Subsequently, the second transverse axis A2, in particular, is positioned, along the horizontal longitudinal direction X, farther to the rear in the emergency exit position 10*c* than in the easy entry position 10*b*. The space available for a person to pass behind the seat 10 is therefore a priori smaller in the emergency exit position 10*c*. This emergency exit position 10*c* does however serve to reduce the longitudinal dimension of the seat 10 compared to the nominal position.

In the emergency exit position 10*c*, each mobile element 36 is kept in position relative to the associated fixed element 32 by the lock of the track 16.

Alternatively, it is possible to disengage the actuator 46 and the lock from the track 16. In this case it is possible to push the seat 10 after tilting or at the same time as tilting the seatback 12. This way the space available to the person seated behind the seat 10 for extricating themselves from the vehicle equipped with this seat 10 may be further increased.

FIG. 7 shows a third example of a process for using the seat 10.

According to this third example, the seatback framework 18 is folded down above the seat bottom 14, in particular above the seat bottom framework 48, by pivoting relative to the base 20, around the first transverse axis A1. The seat 10 thus reaches the position 10*d* from FIG. 7, called tray position. In this tray position 10*d*, the back of the seatback framework 18 preferably extends in a plane P, where plane P is, also preferably, substantially horizontal. In other words, preferably, in the tray position 10*d*, the back of the seatback framework 18 extends preferably in a plane P substantially parallel to the plane of extension of the tracks 16. The back of the seatback framework 18 may then be used as a tray.

This tray position 10*d* is here reached without moving any other element of the seat 10 than the seatback framework 18. In particular, here:
  each lock 38 is kept locked;
  the mobile element 36 of each track 16 is kept in the longitudinal position thereof for the initial nominal position of the seat 10;
  the position of each connecting rod 50 is retained.

In order to be able to reach this tray position 10*d*, each hinge mechanism 22 is for example of the type which allows adjusting the inclination of the seatback framework 18 relative to the base 20, in several positions. Each hinge mechanism 22 may then be continuous or discontinuous. In the first case, each hinge mechanism 22 serves to adjust the inclination of the seatback framework 18 relative to the base 20, in any position included between two end positions. In the second case, each hinge mechanism serves to adjust the inclination of the seatback framework 18 relative to the base 20, in a finite number of discrete positions between two end positions. In both cases however, each hinge mechanism 20 preferably has a disengaged position, in which the seatback framework 18 may pivot freely relative to the base 20, around the first transverse axis A1. Each hinge mechanism 22 may thus advantageously have a "disengaged" mode for folding down the seatback framework 18, in contrast to an "engaged" mode, in which each hinge mechanism 22 allows adjustment of the inclination of the seatback framework 18 relative to the base 20. Preferably, each hinge mechanism 22 is electrically commanded. In that way, adjustment of the inclination of the seatback framework 18 relative to the base 20 is done by means of command buttons for the hinge mechanism(s) 22. To do that, each hinge mechanism may for example comprise a drive motor, or a shared drive motor may actuate both hinge mechanisms 22. Each drive motor may then be commanded by means of command buttons.

Alternatively, each hinge mechanism 22 may be a system of the "hook-cam" type comprising a cam and having an angular adjustment range in which the hinge mechanism 22 is nonblocking, corresponding to the disengaged position, and another adjustment range, distinct from the first, in which the hinge mechanism 22 may be blocked, corresponding to the engaged position. For example, each hinge mechanism 22 must be unlocked or even disengaged in order to be able to adjust the angular position of the seatback framework 18 relative to the base 20, where the adjustment is done while keeping each hinge mechanism 22 unlocked or even disengaged. Then, once the satisfactory angular position is reached, each hinge mechanism 22 is locked or even engaged again.

Again alternatively, each hinge mechanism 22 may only allow locking the seatback framework 18 in a single angular position around the first transverse axis A1, compared to the base 20. In a disengaged position of each hinge mechanism 22, the seatback framework 18 is freed to pivot around the first transverse axis A1 relative to the base 20.

According to still another alternative, each hinge mechanism 22 is unlockable and matched for maintaining the angular position of the seatback framework 18 relative to the base 20 in the locked position thereof. The hinge mechanism 22 may then allow selectively locking and unlocking the rotation of the seatback framework 18 relative to the base 20. The hinge mechanism 22 may then be suited to keeping the seatback framework 18 in any angular position relative to the base 20, in a finite number of angular positions, or even in a single angular position of the seatback framework 18 relative to the base 20. In this latter case, the seat 10 and the seatback 12 have a single comfort position suited to receiving an occupant.

FIG. 8 shows a second example of a seat 100. This second example of a seat 100 is distinguished from the first example of a seat 10 in that the seat bottom framework 48 is here mounted pivoting around the third transverse axis A3, relative to the seatback framework 18 and not relative to the base 20, as in the first example of a seat 10.

To do that, the seat bottom framework 48 has stringers 48$_1$ having an "L" shaped section, such that the third transverse axis A3 extends to near the upper end of the "L" of the stringers 48$_1$. It should be noted here that the third transverse axis A3 is arranged vertically above the first transverse axis A1 of pivoting of the seatback framework 18 relative to the base 20.

The seat 100 may also pass from a nominal configuration such as shown in FIG. 8, suited to receiving an occupant of the seat, to an easy entry position 100b shown in FIG. 10. The process for doing this is substantially similar to the first implementation process in the case of the first example of a seat 10.

As with the first process for using the first example of the seat 10, a first step, shown by FIG. 8, consists of moving the seat 100 and, preferably synchronized, the mobile element 36 of each slider 16 longitudinally forward. This longitudinal movement F11 is done until bringing each slider 28 to stop against the end 34 of the respective slit 30. The seat 100 in that way reaches the position 100a thereof shown in FIG. 9 at the end of this first step. This movement F11 may be done by means of the single actuator 46 (not shown on the figures).

During this first step, the configurations of the seatback 12 and the seat bottom 14 are preferably kept unchanged.

As it relates to the seatback 12, this means in particular that the relative position of the seat bottom framework 18 around the first transverse axis A1 relative to the base 20 is preferably retained. In that way, preferably, each hinge mechanism 22 is kept in position during the movement F11. Alternatively, in the case where hinge mechanisms 22 are motorized, the seatback framework 18 may be moved during this first step, relative to the base 20, in particular in order to limit the bulk of the seatback 12. In particular, each hinge mechanism 22 may command a rotation of the seatback framework 18 relative to the base 20, around a first transverse axis A1, bringing the seatback framework 18 to extend in the extension of the risers 24 of the base 20. In other words, each hinge mechanism 22 may command a rotation of the seatback framework 18 relative to the base 20, around a first transverse axis A1, bringing the seatback framework 18, in particular the back of the seatback framework 18, to extend in the plane or parallel to the plane of extension of the crosspiece 26 of the base 20.

Further, each lock 38 is preferably kept locked over the majority of this first step, or even throughout all of this first step. However, preferably, each lock 38 is unlocked during this first step, while each slider 28 comes closer to the axial end 34 of the slit 30 in which it is received, without contacting this axial end 34 of the slit 30. Alternatively, however, each lock 38 may be unlocked before this first step—therefore before the movement F11 of the mobile element 36 of each slider 16—or even after this first step. In this latter case, the process comprises an intermediate step consisting of unlocking each lock 38 when each slider 28 is stopped against the end 34 of the respective slit 30.

As it relates to the seat bottom 14, the relative positions of the seat bottom framework 48 relative to each connecting rod 50, on the one hand, and each connecting rod 50 relative to the mobile element 36 of the associated slider 16, on the other hand, are also kept during this first step.

Once the seat 100 is in the configuration 100a thereof from FIG. 9 in which each slider 28 is stopped against the axial end 34 of the respective slit 30 and each lock 38 is unlocked, the process continues with a second step consisting here of commanding a continuation of the forward movement F11 of the mobile element 36 of each slider 16, while each slider 28 is stopped against the end 34 of the slit 30 in which it is received. The movement F11 then tends to increase the distance between the second and fifth transverse axes A2, A5, while a forward movement of the second end 24$_2$ of the risers 24 of the base 20 is blocked during this second step. Subsequently, the movement F11 of the mobile elements 36 of each track 16, here commanded by the actuator 46, pulls on the seatback 12, via the seat bottom 14, near the third transverse axis A3. The seatback 12 then tends to pivot or tilt around the second transverse axis A2 as shown by the arrow F12 in FIG. 9. This causes the lifting of the intermediate end 24$_3$ of each riser 24 of the base 20 relative to the mobile element 36 of the respective slider 16. Because each lock 38 is unlocked, this lifting of the intermediate end 24$_3$ of each riser 24 of the base 20 is allowed.

The pivoting F12 of the seatback 12 here accompanies a relative pivoting F13 around the third transverse axis A3, of the seatback 12 relative to the seat bottom 14. This pivoting F13 of the seatback 12 relative to the seat bottom 14 tends to increase the distance between the second and fourth transverse axes A2, A4.

Each first spring 54 (not shown on the figures) is then advantageously conformed for avoiding a pivoting of each connecting rod 50 relative to the seat bottom framework 48, tending to increase the distance between the third and fifth transverse axes A3, A5, accompanying the movement F11 of the mobile element 36 of each track 16, at least in a first step. For example, the force C1 exerted by each first spring 54 compensates for the component of the weight of the seat 10 that tends to pivot each connecting rod 50, associated with the respective first spring 54, relative to the seat bottom framework 48. Thus, advantageously, during the second step of this process, there is no relative rotation of the connecting rods 50 relative to the seat bottom framework 48, around the fourth transverse axis A4. Better, here, the force C1 is such that each connecting rod 50 pivots around the fourth transverse axis A4 such that each connecting rod 50 tends towards a position where it extends under the seat bottom framework 48, as shown by the arrow F14 on FIG. 9.

Further, the action of each second spring 62 (not shown on the figures), tending to pivot each connecting rod 50 around a fifth transverse axis A5, as shown by the arrow F15 in FIG. 9, may contribute to the pivoting F12 of the seatback 12 of the seat around the second transverse axis A2. In that way, the raising of the seatback 12 relative to the mobile element 36 of each track 16 is made easier. This may allow in particular sizing the actuator 46, in particular the motor of this actuator 46, in light of the main functions thereof of moving the mobile element 36 of each track 16 without having to consider the excess or some of the excess power needed for lifting the seatback 12 of the seat 16 during this second step.

Again during this second step, the relative position of the seat bottom framework 18 around the first transverse axis A1 relative to the base 20 is preferably kept unchanged. In that way, preferably, each hinge mechanism 22 is kept in position during this second step.

Thus, the seat 100 is brought to the position 100b shown in FIG. 10, and called easy entry. In this position 10b of the seat 100, the seatback 12 has tilted around the second transverse axis A2, relative to the normal position from FIG. 8. Having done that, the longitudinal bulk of the seat 100 is reduced. This way, the space available for a user to access the seat located behind the seat 100 is increased. It can in particular be noted here that the distance between the first and fifth transverse axes A1 and A5 of the seat 100, measured along the horizontal longitudinal direction X is smaller in the easy entry position 100b than in the nominal position from FIG. 8. Additionally, the seat 100 is moved longitudinally forward in the easy entry position 100b. The space available for a user to access the seat located behind the seat 100 is even further increased.

Preferably, the second example of a seat 100 may also be configured in an emergency exit position by implementing a process similar to the one described relating to the first example of a seat 10.

The seat 100 may also be in a position in which the seatback 12 extends substantially horizontally or even exactly horizontally. Here, considering the height of the base 20, this position may be described as "flat floor" position instead of tray position as was the case for the first example of the seat 10 previously described.

Placing the seat 100 in flat floor position, starting from the position for receiving an occupant, can be done without implementing the actuator 46 or even disengaging the actuator 46 and unlocking the lock from the tracks 16. In order to implement this placement of the seat 100 in flat floor position, the locks 38 are preferably kept locked.

To implement this change of tray position, a pivoting of the seatback 12 relative to the base 20, around the first transverse axis A1, is ordered so that the seatback 12 extends substantially horizontally, preferably horizontally.

In this case, the pivoting of the seatback 12 around the first transverse axis A1 pulls on the seat bottom 14 which in turn pivots relative to the seatback 12 around the third transverse axis A3. This pivoting of the seat bottom 12 may cause a lowering of the seat bottom 12 in particular of the front end of the seat bottom 12. This lowering is accentuated when the mobile element 36 of the slider is free to move, where the mobile element 36 is then advanced because of the pivoting of the seat bottom 12 around the third transverse axis A3.

The present disclosure is not limited to the examples described above with reference to the figures. The present disclosure encompasses in contrast all the variants and combinations which could be considered by the person skilled in the art connected with the protection sought.

For example, in the example shown, the seatback 12 comprises a seatback framework 18 hinged relative to the base 20. This provides better comfort for the occupant of the seat 10, who may adjust the inclination of the seatback framework 18. However, the seatback 12 may alternatively be made as a single part, or by an assembly of rigidly connected parts, without the possibility of moving one of these parts relative to the others. In other words, the seatback 18 may comprise a base 12 and a rigidly connected seatback 18 framework. The seatback 18 might not have a hinge mechanism 22.

Similarly, in the examples described, the seat bottom 14 comprises a seat bottom frame 48, and a connecting rod 50 for connecting the seat bottom framework 48 to the mobile element 36 of each track 16. Alternatively however, the seat bottom 14 may be made as a single part, or by an assembly of rigidly connected parts, without the possibility of moving one of these parts relative to the others. In this case, the first spring(s) 54 are unnecessary. However, the mobility of the seat bottom framework 48 relative to each connecting rod 50 and the presence of the first spring(s) 54 allows the seat to have an emergency exit configuration which seems particularly useful from a safety perspective.

In the case of the examples described, the actuator 46 is used to implement the process with which to change from the nominal configuration to an easy entry configuration. The seat may however, in a degraded version, not have an actuator 46. In this case, the change from a nominal position to the easy entry position 10b, 100b is done at least partially manually: each lock 38 being unlocked, the seatback 12 of the seat 10, 100 is straightened up by exerting a force along the horizontal, longitudinal direction X on the seatback. This force may be a push, in particular if it is exerted by the person behind the seat 10, 100 or a pull if it is exerted in particular by a person from outside the vehicle equipped with the seat 10, 100.

Preferably, the number of connecting rods 50 is equal to the number of tracks 16.

Further, the seat preferably does not comprise any other connecting rod(s), nor other connection(s) between these constituent elements than those previously described. Alternatively however, the seat may comprise other connecting rods and/or other connections between these constituent elements, for example in order to provide other functionalities of the seat, corresponding to other configurations than those previously described.

Further, in the examples described, one end $24_2$ of each riser 24 of the base 20 of the seatback 12 is mounted rotating relative to a slider 28, around a second transverse axis A2, where the slider 28 is received in the slit 30 of the fixed element of a track 16. However, the person skilled in the art can conceive of other ways the mounting of the seatback 12 allowing it to pivot around a longitudinally mobile transverse axis A2. For example, the seatback may comprise transverse projections received slidably and pivotably in a slit or groove of the fixed element of each track 16. Alternatively, a cylindrical rod passing through a slit in the fixed element of the track may be received in two housings of a single end of the seatback forming a fork. The fixed element may also comprise a longitudinal rib, on which a slider is mounted, where the slider is further mounted pivoting relative to one end of the seatback.

Finally, in the examples described, the longitudinal displacement of the seatback 12 is limited by the slider 28 stopping against the longitudinal end 34 of the slit 30. The person skilled in the art may however conceive other means for forming a stop limiting the longitudinal movement of the seatback 12. For example, the stop may be formed by a distinct relief of the fixed element 32 of the slider 16.

In the automotive field in particular, a vehicle seat configured for being able to present a position improving access to the places located behind the seat ("easy entry position"; in the remainder, the position is called "easy entry"). Such a seat may be implemented in a vehicle comprising a number of pairs of doors less than the number of rows of seats, in order to allow access to the last row of seats in the vehicle, meaning the row of seats arranged longitudinally the farthest to the rear of the vehicle.

The easy entry position corresponds to configuration of the seat where the seatback of the seat is inclined towards a seat bottom of the seat. The seat is mounted on tracks. In this case, the easy entry position may advantageously also correspond to the farthest forward possible position of the seat along the tracks.

In a comparative seat, at least one specific actuator may be used in order to command changing from a nominal position of the seat, in which an occupant is received, to an easy entry position. However, this makes the comparative seat more complex. Also, it increases the cost of the seat.

The present disclosure aims to improve the situation.

For this purpose, a vehicle seat is described comprising:
  a seatback;
  a seat bottom mounted pivoting relative to the seatback around a first transverse axis;
  at least one track, where the track comprises a fixed element and a mobile element moveable relative to the fixed element along a longitudinal direction;
wherein:
  the seat bottom pivots relative to the mobile element of the track, around a second transverse axis;
  near one end, the seatback is mounted sliding along the longitudinal direction relative to the fixed element of the track;
  near the end, the seatback is further mounted pivoting relative to the fixed element of the track around a third transverse axis, where the third transverse axis is mobile along the longitudinal direction;
  a stop limits the longitudinal movement of the end of the seatback; and
  the seat bottom is shaped for pulling on the seatback and causing the rotation of the seatback around the third transverse axis, in case of movement of the mobile element of the track relative to the fixed part, tending to increase the distance between the second transverse axis and the third transverse axis, while the stop blocks the movement of the end of the seatback.

In that way, advantageously, the seat has kinetics in which the easy entry position may be reached without making use of a specific actuator. In particular, in the case where the seat comprises at least one track moved by a motor, this motor may suffice for reaching the easy entry position of this kinematics.

According to preferred embodiments, the seat comprises one or more of the following characteristics taken alone or in combination:
  the seat comprises two parallel tracks, separated along a transverse direction;
  the seat bottom pivots relative to the mobile elements of each track, around a second transverse axis; one end of the seatback is mounted sliding along the longitudinal direction relative to the fixed element of each track; each end of the seatback is further mounted pivoting relative to the fixed element of a respective track, around a third transverse axis, where the third transverse axis is mobile along the longitudinal direction; a stop limits the longitudinal movement of each end of the seatback, where the two stops are aligned along a transverse direction; and the seat bottom is shaped for pulling on the seatback and causing a rotation of the seatback around the third transverse axis in case of movement of the mobile element of each track relative to the fixed part, aiming to increase the distance between the second transverse axis and the third transverse axis, while the stops block the movement of the ends of the seatback;
  the seat further comprises an actuator, preferably just one, for commanding the movement of the mobile element of each track, relative to the respective fixed element;
  the seatback is further fixed to the mobile element of at least one track, preferably of each track, by a lock, where the seat preferably has a command device for unlocking of each lock;
  the seatback comprises a seatback framework, a base, and at least one hinge mechanism with which to change the relative position of the seatback framework relative to the base, around a fourth transverse axis;
  the seat bottom is mounted pivoting on the base;
  the seat bottom is mounted pivoting on the seatback framework;
  a first spring elastically forces the seat bottom to rotate relative to the mobile element of each track, around the second transverse axis, towards a position in which the rear of the seat bottom is raised relative to the front of the seat bottom;
  the seat bottom comprises a seat bottom framework, mounted pivoting relative to the seatback around the first transverse axis, and a connecting rod joining the seat bottom framework to the mobile element of each track, where each connecting rod pivots relative to the mobile element of the respective track around the second transverse axis;
  the or each connecting rod and the seat bottom framework are rigidly connected in movement;
  the or each connecting rod pivots relative to the seat bottom framework, around a fifth transverse axis;
  the seat further comprises a second spring elastically constraining each connecting rod in rotation relative to the seat bottom framework around the fifth transverse axis, towards a folded back position under the seat bottom framework;
  near each end, the seatback, in particular the base if applicable, is fixed to a slider longitudinally moveable relative to the fixed element of a respective slider;
  the slider is received sliding in a slit in the fixed element of the respective track;

the seatback is mounted on each slider pivoting around the third transverse axis; and the stop is formed by a longitudinal end of the slit.

A vehicle is also described, in particular an automotive vehicle, comprising a chassis and a body defining a passenger compartment with a floor, and at least one seat such as described above in all combinations thereof, where the fixed element of each track is fixed to the floor or formed by the floor of the passenger compartment.

The vehicle may in particular comprise at least one door arranged longitudinally by the seat, and at least one other seat arranged longitudinally behind the seat. The vehicle might not have a door arranged longitudinally near the other seat.

According to another aspect, a process is described for using a seat such as described above, in all combinations thereof, allowing changing from a position suited to receiving an occupant to an easy entry position, where the process comprises the step i) consisting of moving the mobile element of each track relative to the associated fixed element in the direction tending to increase the distance between the second transverse axis and the third transverse axis while each stop prevents the movement of a respective end of the seatback.

The process may comprise a step ii), preceding the step i), consisting of moving the mobile element of each track relative to the fixed element, until each stop prevents the movement of a respective end of the seatback.

Alternately or additionally, the process may further comprise a step iii), prior to step i), consisting of unlocking each lock.

According to another aspect, a process is described for using a seat such as described above in all combinations thereof, wherein the process allows changing from a position suited to receiving an occupant, and an emergency exit position, where the process comprises the step a) consisting of unlocking each lock, and step b), subsequent to step a), consisting of exerting a force on the seatback along a substantially longitudinal direction, in particular by pushing or pulling, in order to cause the rotation of the seatback around a third transverse axis.

According to another aspect, a process is described for using a seat such as described above in all combinations thereof, wherein the process allows changing the seat from a position suited for receiving an occupant into a position called "flat floor" in which the seatback extends facing the seat bottom, where the process comprises the step consisting of pivoting the seatback relative to the base, around the fourth transverse axis, in order to reach a position in which the seatback is substantially horizontal, the pivoting of the seatback causing a pivoting of the seat bottom relative to the seatback framework accompanying a lowering of at least a part of the seat bottom relative to the position for receiving an occupant.

A vehicle seat (10) comprising: seatback (12); a seat bottom (14) mounted pivoting relative to the seatback (12) and a track (16) comprising a fixed element (32) and a mobile element (36) moveable relative to the fixed element (32). The seat bottom (14) pivots relative to the mobile element (36) of the track (16). The seatback (12) slides relative to the fixed element (32) of the track (16). The seatback (12) pivots relative to the fixed element (32) of the track (16), around the mobile transverse axis (A2). A stop (34) limits the movement of the seatback (12). The seat bottom (14) is shaped for pulling on the seatback (12) and causing the rotation of the seatback (12), in case of movement of the mobile element (36) of the track (16) relative to the fixed part (32) once the stop (34) blocks the movement of the seatback (12).

The invention claimed is:

1. A vehicle seat comprising
a seatback,
a seat bottom mounted pivoting relative to the seatback around a first transverse axis,
at least one track, where the at least one track comprises a fixed element and a mobile element moveable relative to the fixed element along a longitudinal direction,
wherein the seat bottom pivots relative to the mobile element of the at least one track, around a second transverse axis, near one end, the seatback is mounted sliding along the longitudinal direction relative to the fixed element of the at least one track,
near the one end, the seatback is further mounted pivoting relative to the fixed element of the at least one track around a third transverse axis, where the third transverse axis is mobile along the longitudinal direction,
a stop limits the longitudinal movement of the one end of the seatback; and
the seat bottom is shaped for pulling on the seatback and causing the rotation of the seatback around the third transverse axis, in case of movement of the mobile element of the at least one track relative to the fixed element, tending to increase the distance between the second transverse axis and the third transverse axis, while the stop blocks the movement of the end of the seatback.

2. The vehicle seat of claim 1, further comprising two tracks, the two tracks being parallel, separated along the transverse direction, each of the two tracks comprising a fixed element and a mobile element moveable relative to the fixed element along a longitudinal direction.

3. The vehicle seat of claim 2, wherein the seat bottom pivots relative to the mobile element of each of the two tracks, around the second transverse axis; one end of the seatback is mounted sliding along the longitudinal direction relative to the fixed element of each of the two tracks; each one end of the seatback is further mounted pivoting relative to the fixed element of a respective track among the two tracks around the third transverse axis, where the third transverse axis is mobile along the longitudinal direction; the stop limits the longitudinal movement of each one end of the seatback, where the stops for each of the one end of the seatback are aligned along a transverse direction; and the seat bottom is shaped for pulling on the seatback and causing the rotation of the seatback around the third transverse axis, in case of movement of the mobile element of each of the two tracks relative to the fixed element, aiming to increase the distance between the second transverse axis and the third transverse axis, while the stops block the movement of the ends of the seatback.

4. The vehicle seat of claim 1, further comprising an actuator for commanding the movement of the mobile element of the at least one track, relative to the respective fixed element.

5. The vehicle seat of claim 1, wherein the seatback is further fixed to the mobile element of the at least one track by a lock.

6. The vehicle seat of claim 1, wherein the seatback comprises a seatback framework, a base, and at least one hinge mechanism with which to change the relative position of the seatback framework relative to the base, around a fourth transverse axis.

7. The vehicle seat of claim 6, wherein the seat bottom is mounted pivoting on the base.

8. The vehicle seat of claim 6, wherein the seat bottom is mounted pivoting on the seatback framework.

9. The vehicle seat of claim 1, wherein a first spring elastically forces the seat bottom to rotate relative to the mobile element of the at least one track, around the second transverse axis, towards a position in which the rear of the seat bottom is raised relative to the front of the seat bottom.

10. The vehicle seat of claim 1, wherein the seat bottom comprises a seat bottom framework, mounted pivoting relative to the seatback around the first transverse axis, and a connecting rod joining the seat bottom framework to the mobile element of the at least one track, where each connecting rod pivots relative to the mobile element of the respective track around the second transverse axis.

11. The vehicle seat of claim 10, wherein each connecting rod and the seat bottom framework are rigidly connected in movement.

12. The vehicle seat of claim 10, wherein each connecting rod pivots relative to the seat bottom framework, around a fifth transverse axis.

13. The vehicle seat of claim 12, further comprising a second spring elastically constraining each connecting rod in rotation relative to the seat bottom framework around the fifth transverse axis, towards a folded back position under the seat bottom framework.

14. The vehicle seat of claim 1, wherein, near each end, the seatback is fixed to a slider longitudinally moveable relative to the fixed element of a respective slider.

15. The vehicle seat of claim 14, wherein the slider is received sliding in a slit in the fixed element of the respective track.

16. The vehicle seat of claim 15, wherein the seatback is mounted on each slider pivoting around the third transverse axis.

17. The vehicle seat of claim 15, wherein the stop is formed by a longitudinal end of the slit.

18. A process for using a seat according to claim 1, and for allowing changing from a position suited to receiving an occupant to an easy entry position, wherein the process comprises the step i) consisting of moving the mobile element of the at least one track relative to the associated fixed element in the direction tending to increase the distance between the second transverse axis and the third transverse axis while each stop prevents the movement of a respective end of the seatback.

19. The process of claim 18, further comprising a step ii), preceding the step i), consisting of moving the mobile element of the at least one track relative to the fixed element, until each stop prevents the movement of a respective end of the seatback.

20. The process of claim 18, wherein the seatback is further fixed to the mobile element of the at least one track by at least one lock, wherein the process further comprises a step iii), prior to step i), consisting of unlocking the at least one lock.

21. A process for using a seat according to claim 12, wherein the seatback is fixed to the mobile element of the at least one track by at least one lock, wherein the process allows changing from a position suited to receiving an occupant, and an emergency exit position, wherein the process comprises the step a) consisting of unlocking the at least one lock, and step b), subsequent to step a), consisting of exerting a force on the seatback along a substantially longitudinal direction, in particular by pushing or pulling, in order to cause the rotation of the seatback around the third transverse axis.

22. A process for using a seat according to claim 8, wherein the process allows changing the seat from a position suited for receiving an occupant into a position called "flat floor" in which the seatback extends facing the seat bottom, wherein the process comprises the step consisting of pivoting the seatback relative to the base, around the fourth transverse axis, in order to reach a position in which the seatback is substantially horizontal, the pivoting of the seatback causing a pivoting of the seat bottom relative to the seatback framework accompanying a lowering of at least a part of the seat bottom relative to the position for receiving an occupant.

* * * * *